United States Patent
Liu (10) Patent No.: US 8,942,332 B2
(45) Date of Patent: Jan. 27, 2015

(54) SYSTEM AND METHOD FOR DATA SERIALIZATION AND INTER SYMBOL INTERFERENCE REDUCTION

(71) Applicant: Taiwan Semiconductor Manufacturing Co., Ltd., Hsin-Chu (TW)

(72) Inventor: Chih-Min Liu, Zhubei (TW)

(73) Assignee: Taiwan Semiconductor Manufacturing Co., Ltd., Hsin-Chu (TW)

( * ) Notice: Subject to any disclaimer, the term of this patent is extended or adjusted under 35 U.S.C. 154(b) by 107 days.

(21) Appl. No.: 13/716,250

(22) Filed: Dec. 17, 2012

(65) Prior Publication Data

US 2014/0169416 A1   Jun. 19, 2014

(51) Int. Cl.
- H03D 1/06   (2006.01)
- H03D 11/04  (2006.01)
- H03K 5/01   (2006.01)
- H03K 6/04   (2006.01)
- H04B 1/40   (2006.01)

(52) U.S. Cl.
CPC .................................. H04B 1/40 (2013.01)
USPC ........................................................ 375/348

(58) Field of Classification Search
None
See application file for complete search history.

(56) References Cited

U.S. PATENT DOCUMENTS

| | | | | |
|---|---|---|---|---|
| 5,663,669 A | * | 9/1997 | Vanderschaaf | 327/201 |
| 6,140,835 A | * | 10/2000 | Shirai | 326/24 |
| 8,358,156 B1 | * | 1/2013 | Abugharbieh et al. | 327/108 |
| 2005/0024243 A1 | * | 2/2005 | Kim | 341/101 |

OTHER PUBLICATIONS

Yang, C.K.K. et al., "A 0.5-μm CMOS 4.0-Gbit/s Serial Link Transceiver with Data Recovery Using Oversampling", IEEE Journal of Solid-State Circuits, May 1998, 33(5):713-722.

* cited by examiner

Primary Examiner — Chieh M Fan
Assistant Examiner — Wednel Cadeau
(74) Attorney, Agent, or Firm — Duane Morris LLP (57) ABSTRACT

A system and method is disclosed for reducing inter symbol interference in a high speed data transfer system. One or more decision logic circuits and one or more pull circuits are used to enable the signal level of a bit in a serial bit stream to achieve its nominal value.

20 Claims, 7 Drawing Sheets

SYSTEM AND METHOD FOR DATA SERIALIZATION AND INTER SYMBOL INTERFERENCE REDUCTION

BACKGROUND

The use of high speed data transfer circuitry continues to expand as electrical and electronic devices handling large amounts of data proliferate. One example of such high speed data transfer circuitry is a parallel in, serial out data serializer. Data serializers, as well as other high speed data transfer circuitry, are prone to introduce inter symbol interference ("ISI") into the data stream. The presence of ISI typically reduces the data transfer capability of a system as it leads to an increase in bit error rate and/or increased jitter.

In typical high speed data serializers, a serial stream of binary data bits is produced where each data bit has a signal level which represents a logical "1" (or "high") or a logical "0" (or "low"). However, when consecutive bits in the serial stream have different logic levels, e.g., a first bit represents a logical low (nominally, a 0) and the next bit represents a logical high (nominally, a 1), or vice-versa, the actual signal level in the high speed data transfer circuit may not rise or fall to the appropriate nominal value. Thus, inter symbol interference may be induced in the data bit stream.

Thus, there is a need for circuitry and/or method to reduce inter symbol interference.

DETAILED DESCRIPTION

With reference to the figures where like elements have been given like numerical designations to facilitate an understanding of the present subject matter, various embodiments of a system and method for compensating for timing misalignments are described. In order to more fully understand the present subject matter, a brief description of applicable circuitry will be helpful.

Various embodiments for a system and method is disclosed herein for reducing inter symbol interference in a high speed data transfer system. The disclosed embodiments include the use of one or more decision logic circuits and one or more pull circuits to enable the signal level of a bit in a serial bit stream to achieve its nominal value.

Inter symbol interference ("ISI") is a non-ideal effect that may be present during data transfer operations, especially in high speed operations. In a serial stream of data bits, such as the exemplary, but non-limiting, sequence 1011010110000000010100100, the extended string of consecutive 0s will settle well to the nominal signal level value attributable to a logical 0. The length of an extended string of consecutive data bits at the same logical level that will settle well depends on a number of factors and may vary from circuit to circuit. However, the alternating 1s and 0s and/or the alternating short strings of 1s or 0s (either sometimes referred to herein as "toggling") will not settle well to the respective nominal signal level values and therefore may induce ISI in the data transfer circuit.

Figure 1A:
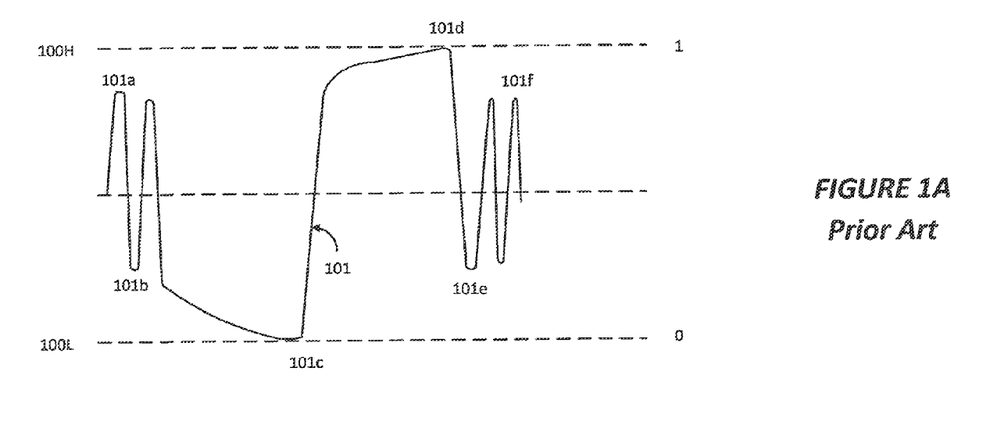
FIG. 1A is a notional illustration of signal levels in a prior art serialized binary data stream.

Considering FIG. 1A, a notional graph 101 of signal levels in a prior art serialized binary data stream is presented. The nominal logical high value (e.g., a 1) is shown at 100H. The nominal logical low value (e.g., a 0) is shown at 100L. Graph 101 represents an exemplary binary data bit stream such as: 10100000111110101. In this exemplary bit stream, the string of five consecutive 0s and the string of five consecutive 1s settles to the respective nominal signal level, i.e., 0 and 1. As mentioned above, the length of consecutive data bits at the same logical level that will settle well varies from circuit to circuit and those of skill in the art will readily understand that the exemplary graph in FIG. 1A is a non-limiting example.

For graph 101, at peak 101a, which corresponds to the first data bit in the sequence above (10100000111110101) with a nominal signal level of 1, it can be seen that the actual signal level at peak 101a is less than the nominal signal level. Likewise, for trough 101b, which corresponds to the second data bit in the sequence (10100000111110101) with a nominal signal level of 0, it can be seen that the actual signal level at trough 101b is greater than the nominal signal level. However, for trough 101c, which corresponds to the data bits in the string of 1s (10100000111110101), in this example this extended string of 0s settles well, at the end of the string, to the nominal signal level of 0. In a similar manner for peak 101d corresponding to the data bits in the string of 1s (10100000111110101), settles well, at the end of the string, to the nominal signal level of 1. The trough at 101e and the peak at 101f are similar to the trough at 101b and the peak at 101a, respectively, as explained above.

Figure 1B:
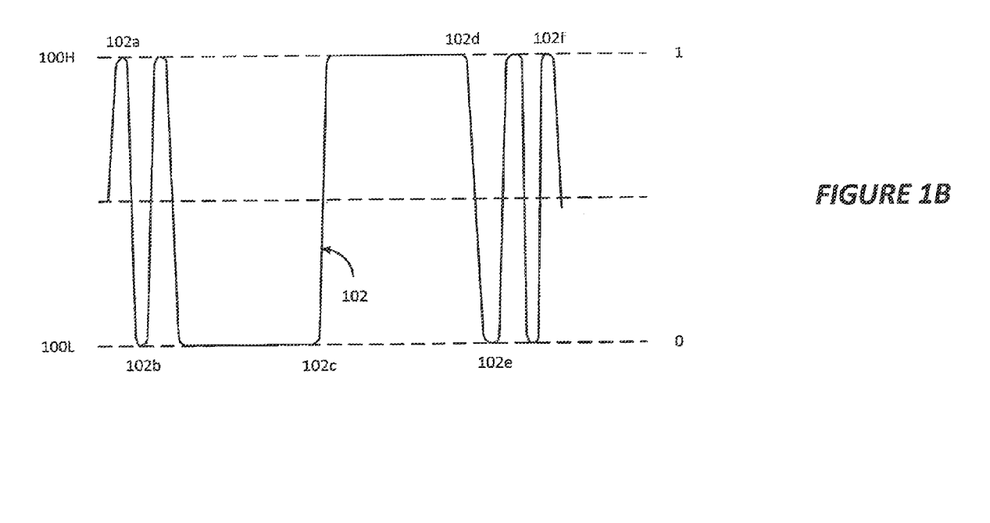
FIG. 1B is a notional illustration of signal levels in a serialized binary data stream according to an embodiment of the present subject matter.

Turning now to FIG. 1B, a notional graph 102 of signal levels in a serialized binary data stream according to an embodiment of the present subject matter in presented. The nominal logical high value (e.g., a 1) is shown at 100H. The nominal logical low value (e.g., a 0) is shown at 100L. As will be explained in further detail below, a pull circuit is employed to drive the signal level of a particular data bit to the nominal signal level for the logical value of that data bit. Using the same exemplary data bit sequence as was used for FIG. 1A, i.e., 10100000111110101, at peak 102a, which corresponds to the first data bit in the sequence above (10100000111110101) with a nominal signal level of 1, it can be seen that the actual signal level at peak 102a the same as, or very near to, the nominal signal level of 1 due to the effect of the pull circuit. This is in contrast to peak 101a in FIG. 1A where there is no pull circuit and the actual signal level was less than the nominal signal level. Likewise, for trough 102b, which corresponds to the second data bit in the sequence (10100000111110101) with a nominal signal level of 0, it can be seen that the actual signal level at trough 102b is the same as, or very near to, the nominal signal level of 0, again as the result of the effect of the pull circuit. For trough 102c, which corresponds to the data bits in the string of 0s (101 00000111110101), the signal level of each of the bits in the string is at, or very near to, the nominal signal level of 0 due to the effects of the pull circuit. In a similar manner for peak 102d corresponding to the data bits in the string of 1s (10100000111110101) the signal level of each of the bits in the string is at, or very near to, the nominal signal level of 1 due to the effects of the pull circuit. The trough at 102e and the peak at 102f are similar to the trough at 102b and the peak at 102a, respectively, as explained above.

Since, for example, the rising point of 102c and 102e are approximately the same, inter symbol interference is reduced as well as jitter and bit error rate.

Figure 2:
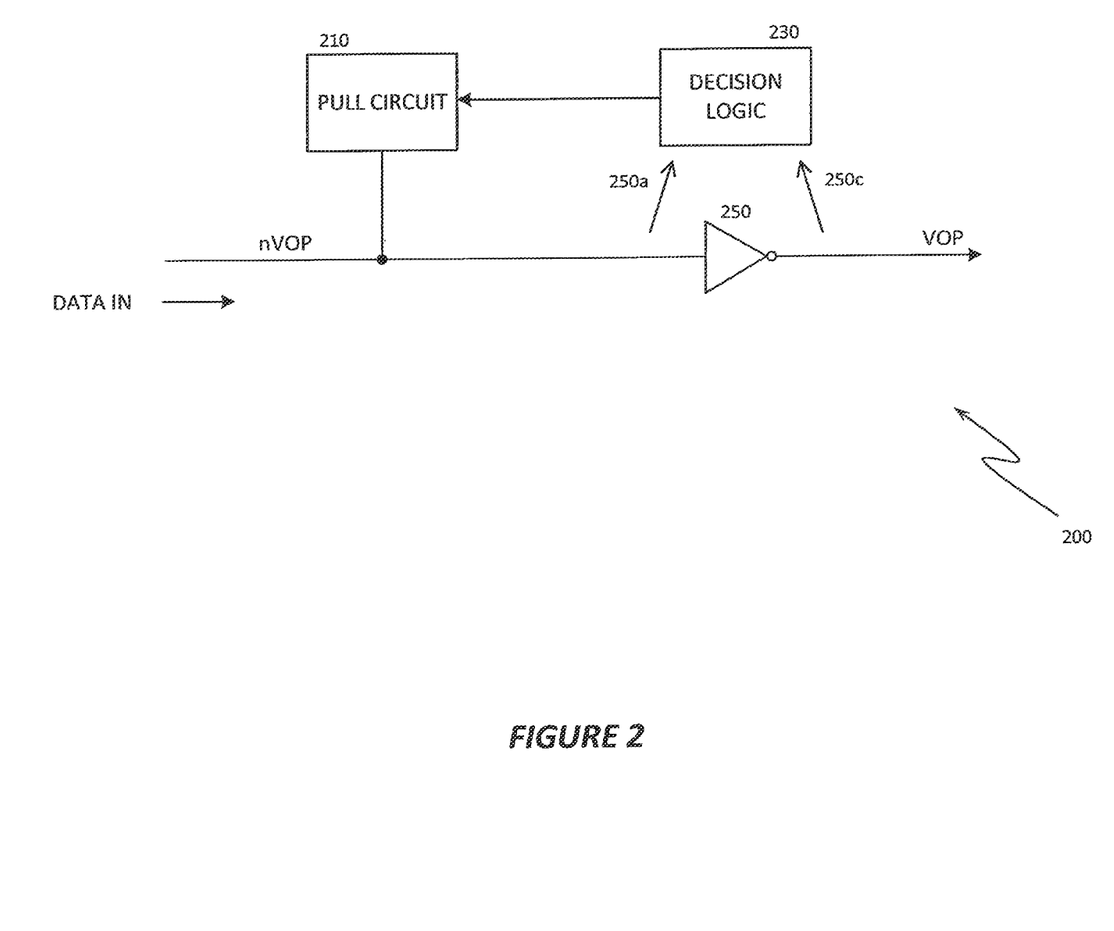
FIG. 2 is an illustration of a functional block diagram of a circuit for reducing inter symbol interference in a serialized binary data stream, according to an embodiment of the present subject matter.

FIG. 2 is an illustration of a functional block diagram of a circuit 200 for reducing inter symbol interference in a serialized binary data stream, according to an embodiment of the present subject matter. A serialized binary data stream is input as shown to node nVOP, is applied to inverting device 250, and is output at VOP. Decision logic circuit 230 receives input from both sides of the inverting device 250, i.e., 250a from the input lead to inverting device 250 and 250c from the output lead of inverting device 250. As will be explained in further detail below, the decision logic circuit 230 produces a control signal when a toggle in the input binary data stream is detected, i.e., when consecutive bits in the input binary data stream have different logic levels. The control signal is applied to the pull circuit 210 which operates to connect node nVOP to either a logical high signal level (not shown) if the decision logic circuit 230 detected a low-to-high toggle or to a logical low signal level (not shown) if the decision logic circuit 230 detected a high-to-low toggle. In this manner, the actual logical signal level of the bits in the input binary data stream can be "pulled" to the nominal level, such as is shown in FIG. 1B.

Thus, circuit 200 can be seen to represent a circuit for reducing inter symbol interference in the input serialized binary data stream. Circuit 200 includes an inverting device 250 having an input lead and an output lead, where a serial stream of binary data bits is supplied to the input lead at node nVOP, inverted by the inverting device 250, and output to the output lead at node VOP. The decision logic circuit 230 is operatively connected across the inverting device 250, i.e., to the input lead at 250a and to the output lead at 250c. The decision logic circuit produces a first control signal when a low-to-high change in signal level between two consecutive data bits of the serial stream of binary data bits is detected, and the decision logic circuit produces a second control signal when a high-to-low change in signal level between two consecutive data bits of the serial stream of binary data bits is detected.

The pull circuit 210 is operatively connected to a first voltage level, a second voltage level, the input lead of the inverting device 250, and the decision logic circuit 230. The pull circuit 210 connects the input lead to the first voltage level (not shown) when the pull circuit receives the first control signal, and the pull circuit 210 connects the input lead to the second voltage level when the pull circuit receives the second control signal.

In an embodiment, the first voltage level is a voltage source at a logical signal high level such as a logical 1, and the second voltage level is ground, i.e., a logical signal low level such as a logical 0. In a further embodiment, the serial stream of binary data bits is supplied from a high speed data serializer and the decision logic circuit 230 includes a NAND gate and a first delay circuit. Additionally, the decision logic circuit 230 further includes a NOR gate and a second delay circuit. In a still further embodiment, the pull circuit 210 includes a p-type MOSFET (metal oxide semiconductor field effect transistor) and an n-type MOSFET. In yet a further embodiment, the pull circuit 210 uses CMOS (Complementary Metal Oxide Semiconductor) devices.

Figure 3:
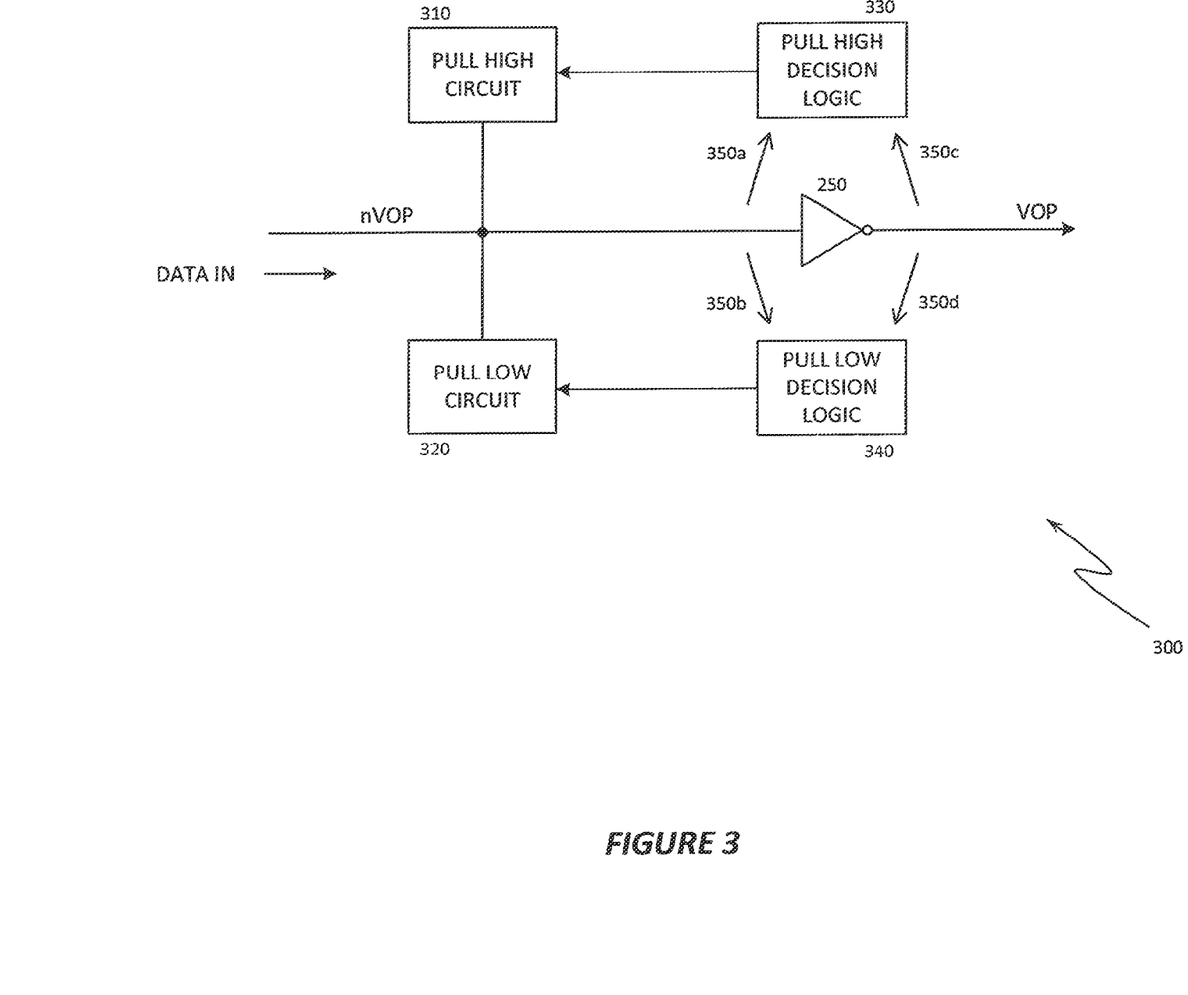
FIG. 3 is an illustration of a functional block diagram of another circuit for reducing inter symbol interference in a serialized binary data stream, according to an embodiment of the present subject matter.

FIG. 3 is an illustration of a functional block diagram of a circuit 300 for reducing inter symbol interference in a serialized binary data stream, according to another embodiment of the present subject matter. The embodiment shown in FIG. 3 is similar to the embodiment shown in FIG. 2, although in FIG. 3 there are separate circuits for high and low decision logic and pull circuits.

A serialized binary data stream is input as shown to node nVOP, is applied to inverting device 250, and is output at VOP. Pull high decision logic circuit 330 receives input from both sides of the inverting device 250, i.e., 350a from the input lead to inverting device 250 and 350b from the output lead of inverting device 250. Similarly, pull low decision logic circuit 340 receives input from both sides of the inverting device 250, i.e., 350b from the input lead to inverting device 250 and 350d from the output lead of inverting device 250. The pull high decision logic circuit 330 produces a first control signal when a low-to-high toggle in the input binary data stream is detected. The first control signal is applied to the pull high circuit 310 which operates to connect node nVOP to a logical high signal level (not shown). Likewise, the pull low decision logic circuit 340 produces a second control signal when a high-to-low toggle in the input binary data stream is detected. The second control signal is applied to the pull low circuit 320 which operates to connect node nVOP to a logical low signal level (not shown). In this manner, the actual logical signal level of the bits in the input binary data stream can be "pulled" to the appropriate nominal level, such as is shown in FIG. 1B.

Thus, circuit 300 can be seen to represent a circuit for reducing inter symbol interference in the input serialized binary data stream. Circuit 300 includes an inverting device 250 having an input lead and an output lead, where a serial stream of binary data bits is supplied to the input lead at node nVOP, inverted by the inverting device 250, and output to the output lead at node VOP. The pull high decision logic circuit 330 is operatively connected across the inverting device 250, i.e., to the input lead at 350a and to the output lead at 350c. The pull high decision logic circuit produces a first control signal when a low-to-high change in signal level between two consecutive data bits of the serial stream of binary data bits is detected. The pull low decision logic circuit 320 is operatively connected across the inverting device 250, i.e., to the input lead at 350b and to the output lead at 350d. The pull low decision logic circuit produces a second control signal when a high-to-low change in signal level between two consecutive data bits of the serial stream of binary data bits is detected.

The pull high circuit 310 is operatively connected to a first voltage level, the input lead of the inverting device 250, and the pull high decision logic circuit 330. The pull high circuit 310 connects the input lead to the first voltage level (not shown) when the pull high circuit receives the first control signal. The pull low circuit 320 is operatively connected to a second voltage level, the input lead of the inverting device 250, and the pull low decision logic circuit 340. The pull low circuit 320 connects the input lead to the second voltage level (not shown) when the pull low circuit receives the second control signal.

In an embodiment, the first voltage level is a voltage source at a logical signal high level such as a logical 1, and the second voltage level is ground, i.e., a logical signal low level such as a logical 0. In a further embodiment, the serial stream of binary data bits is supplied from a high speed data serializer, the pull high decision logic circuit 330 includes a NAND gate and a first delay circuit, and the pull high circuit 310 includes a p-type MOSFET. In a still further embodiment, the pull low decision logic circuit 340 includes a NOR gate and a second delay circuit. The pull low circuit 320 includes an n-type MOSFET. In yet a further embodiment, the pull high circuit 310 and the pull low circuit 320 each use CMOS devices.

Figure 4:
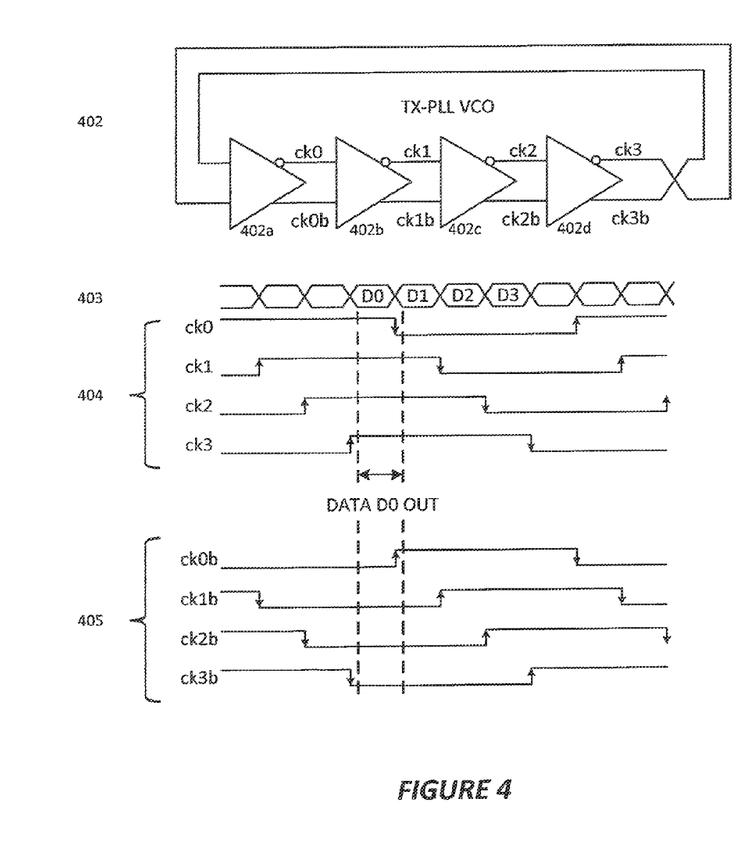
FIG. 4 is a simplified block diagram of a notional transmitter phase lock loop voltage controlled oscillator and illustrating various associated clock signals, according to an embodiment of the present subject matter.

FIG. 4 is a simplified block diagram of a notional transmitter phase lock loop voltage controlled oscillator ("VCO") 402 and further illustrates an exemplary binary data stream 403. Also illustrated are timing diagrams 404 and 405 for nominal associated clock signals, all the above according to an embodiment of the present subject matter.

The VCO 402 includes circuit devices 402a through 402d, the output of each having complementary clock signals. For example, the output of circuit device 402a is a clock 0 signal (ck0) and an inverted clock 0 signal (ck0b). Exemplary clock signal traces for ck0 and ck0b can be seen in timing diagrams 404 and 405, respectively. Correspondingly, the output of circuit device 402b are clock signals ck1 and its inverse ck1b; the output of circuit device 402c are clock signals ck2 and its inverse ck2b; and the output of circuit device 402d are clock signals ck3 and its inverse ck3b. Exemplary traces of each of these clock signals are shown in timing diagrams 404 and 405, respectively.

Figure 5:
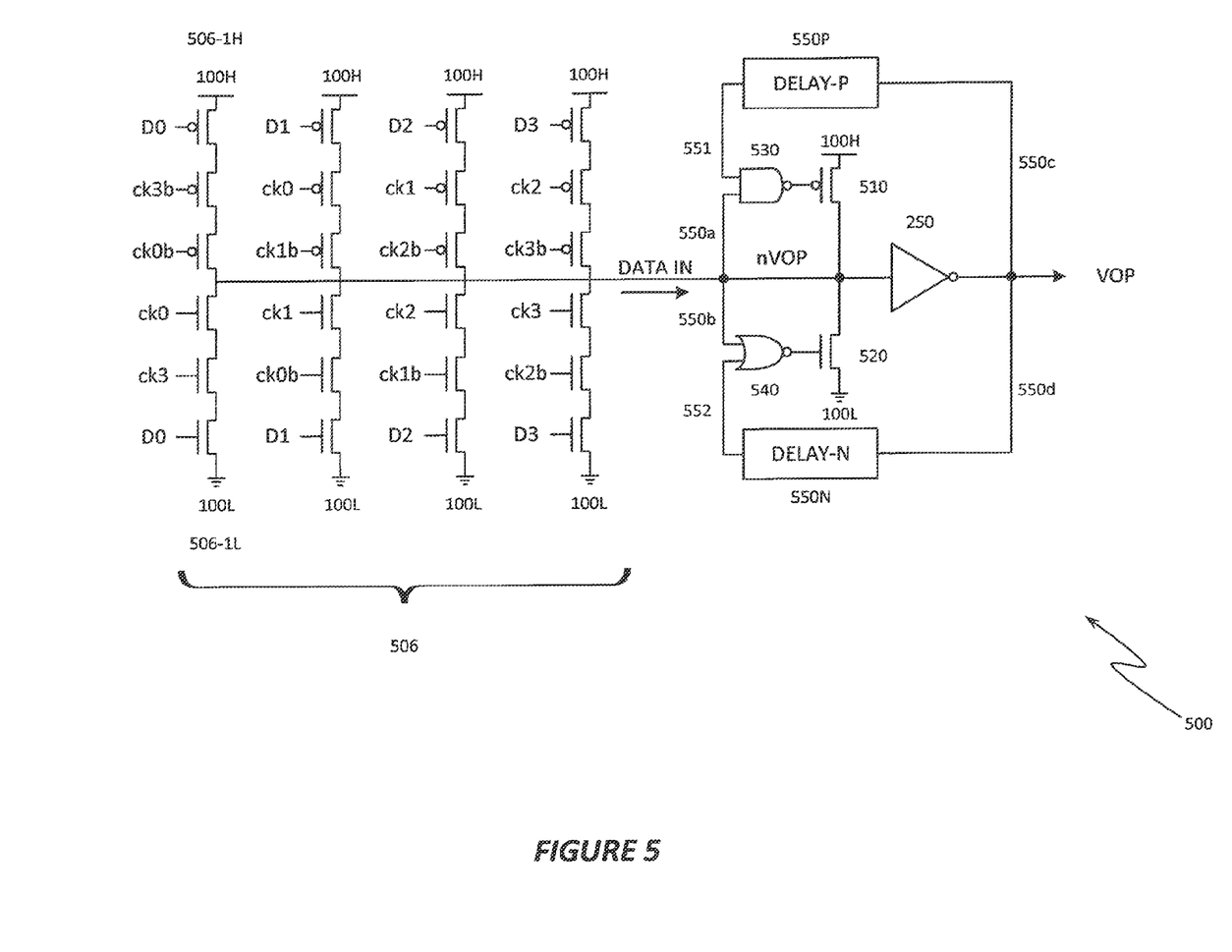
FIG. 5 is an exemplary circuit diagram for reducing inter symbol interference, according to an embodiment of the present subject matter.

FIG. 5 is an exemplary circuit diagram 500 for reducing inter symbol interference, jitter, and/or bit error rate in a serialized binary data stream according to an embodiment of the present subject matter. A serialized binary data stream (DATA IN) is input as shown to node nVOP, is applied to inverting device 250, and is output at VOP. A pull high decision logic circuit includes delay-P circuit 550P and a NAND gate 530. Delay-P circuit 550P receives an input from the output lead of the inverting device 250 along connection 550c. NAND gate 530 receives the output of delay-P circuit 550P along connection 551 and an input from the input lead to inverting device 250 along connection 550a. The output of NAND gate 530 is applied to a pull high circuit 510 which includes a p-type MOSFET. The output of NAND gate 530, such as a first control signal, is applied to the gate node of the p-type MOSFET. The p-type MOSFET is connected to voltage source 100H which is at a voltage level corresponding to a logical high level, or logical 1, and to the input lead of the inverting device 250 at node nVOP. One of skill in the art will readily understand that other types of logic gates and/or MOSFETs, such as CMOS devices, may be utilized in place of those described above and the use of other types of logic gates and/or MOSFETs are contemplated herein. An advantage of using a CMOS device is less heat is generated and less power is consumed.

A pull low decision logic circuit includes delay-N circuit 550N and a NOR gate 540. Delay-N circuit 550N receives an input from the output lead of the inverting device 250 along connection 550d. NOR gate 540 receives the output of delay-N circuit 550N along connection 552 and an input from the input lead to inverting device 250 along connection 550b. The output of NOR gate 540, such as a second control signal, is applied to a pull low circuit 520 which includes an n-type MOSFET. The output of NOR gate 540 is applied to the gate node of the n-type MOSFET. The n-type MOSFET is connected to voltage source 100L which is at a voltage level corresponding to a logical low level, or logical 0 (such as ground), and to the input lead of the inverting device 250 at node nVOP. One of skill in the art will readily understand that other types of logic gates and/or MOSFETs, such as CMOS devices, may be utilized in place of those described above and the use of other types of logic gates and/or MOSFETs are contemplated herein. An advantage of using a CMOS device is less heat is generated and less power is consumed.

The serialized binary data stream (DATA IN) may be supplied by a data serializer 506 as shown. Naturally, the embodiments described herein may be used in conjunction with a serialized binary data stream from any appropriate source. The operation of data serializer 506 can be understood with reference to FIG. 4 and the exemplary binary data stream 403 and associated timing diagrams 404 and 405.

As shown in the upper branch of data serializer 506 in FIG. 5, circuit 506-1H connects voltage source 100H to node nVOP through three p-type MOSFETs: the gate of one MOSFET operates in response to the data signal D0, the gate of a second MOSFET operates in response to clock signal ck3b, while the gate of the third MOSFET operates in response to clock signal ck0b. Thus, for the embodiment illustrated, when each of the three p-type MOSFETs in circuit 506-1H each receive a logical low input, voltage source 100H is applied to node nVOP. In a similar manner, in the lower branch of data serializer 506, circuit 506-1L connects voltage source 100L to node nVOP through three n-type MOSFETs: the gate of one MOSFET operates in response to the data signal D0, the gate of a second MOSFET operates in response to clock signal ck3, while the gate of the third MOSFET operates in response to clock signal ck0. Thus, for the embodiment illustrated, when each of the three n-type MOSFETs in circuit 506-1L each receive a logical high input, voltage source 100L is applied to node nVOP.

Accordingly, considering data bit D0 in FIG. 4 at 403 and the timing diagrams 404 and 405, if D0 is a logical high, then circuit 506-1H in FIG. 5 will not connect voltage source 100H to node nVOP (since at least the MOSFET controlled by the data bit D0 will not conduct) while circuit 506-1L will connect voltage source 100L to node nVOP (since D0 is high, clock signal ck3 is high as shown in timing diagram 404, and clock signal ck0 is high as shown in timing diagram 404). The remaining circuits in the upper and lower branches of data serializer 506 operate in a similar manner based on the logical values of the respective data and clock signals for each circuit. As one of skill in the art will readily grasp, the use of other appropriate combinations of MOSFETS or switching circuitry is contemplated herein.

In operation, a bit in the serialized binary data stream (DATA IN) having a first logical value is applied to the input lead of the inverting device 250 at node nVOP and therefore the output lead of the inverting device 250 will be of the opposite logical value. Thus, in a static state, the inputs to NAND gate 530 will be different and the first control signal output from the NAND gate 530 is a logical high. When the first control signal is applied to the gate of the p-type MOSFET of pull high circuit 510, the pull high circuit will be off (i.e., non-conducting). Similarly, in a static state, the inputs to NOR gate 540 will be different and the second control signal output from the NOR gate 540 is a logical low. When the second control signal is applied to the gate of the n-type MOSFET of pull low circuit 520, the pull low circuit will be off (i.e., non-conducting). Therefore, neither the pull high circuit 510 or the pull low circuit 520 will impede toggling from one bit to the next successive bit.

For the case where two successive bits in the DATA IN stream toggle from low-to-high at node nVOP, at node VOP there will be a toggle from high-to-low. However, the delay-P circuit 550P delays, for a period of time, the toggled VOP signal from being applied to NAND gate 530. Due to this delay, the inputs to the NAND gate will momentarily be the same (logical high) and thus the first control signal will be logical low. When the first control signal is applied to the pull high circuit 510, the p-type MOSFET will be turned on (i.e., conducting) and voltage source 100H will be applied to node nVOP thus assisting node nVOP to settle to a logical high value. After the period of time that delay-P circuit 550P delays the VOP signal, NAND gate 530 will again see different inputs causing the first control signal to be a logical high thereby shutting off the pull high circuit 510. For the NOR gate 540, the delay-N circuit 550N will also delay, for a period of time, the toggled VOP signal from being applied to the NOR gate 540. However, while the inputs to the NOR gate are both the same (logical high), the second control signal will remain logical low and therefore the pull low circuit 520 will remain off (i.e., non-conducting).

For the case where two successive bits in the DATA IN stream toggle from high-to-low at node nVOP, at node VOP there will be a toggle from low-to-high. However, the delay-P circuit 550P delays, for a period of time, the toggled VOP signal from being applied to NAND gate 530. Due to this delay, the inputs to the NAND gate will momentarily be the same (logical low) and thus the first control signal will be logical high. When the first control signal is applied to the pull high circuit 510, the p-type MOSFET will remain off (i.e., non-conducting) and voltage source 100H will not be applied to node nVOP. For the NOR gate 540, the delay-N circuit 550N will also delay, for a period of time, the toggled VOP signal from being applied to the NOR gate 540. Due to this delay, the inputs to the NOR gate will momentarily be the same (logical low), and thus the second control signal will be logical high. When the second control signal is applied to the pull low circuit 520, the n-type MOSFET will turn on (i.e., conducting) and voltage source 100L will be applied to node nVOP thus assisting node nVOP to settle to a logical low value. After the period of time that delay-N circuit 550N delays the VOP signal, NOR gate 540 will again see different inputs causing the second control signal to be a logical low thereby shutting off the pull low circuit 520.

Figure 6:
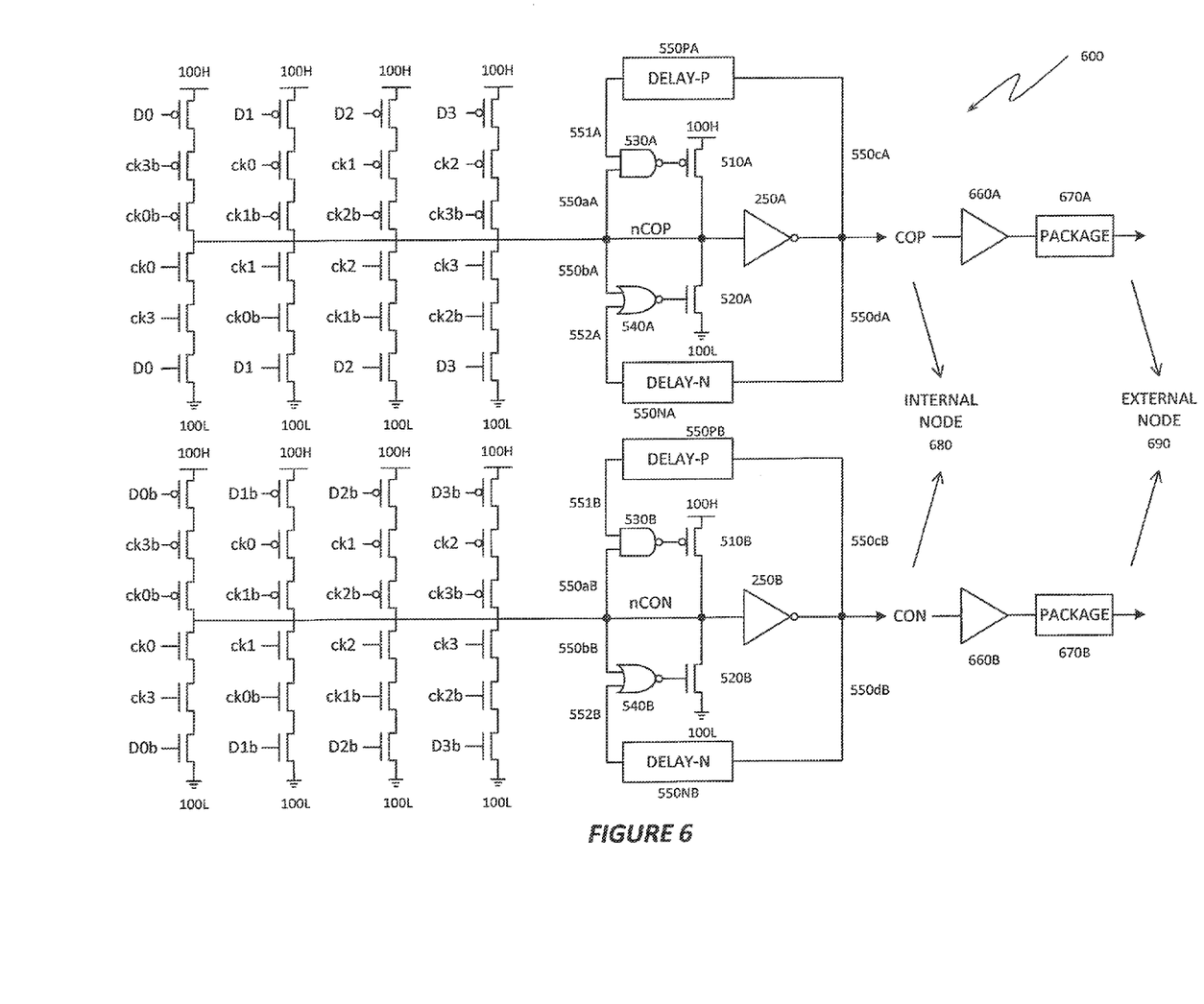
FIG. 6 is an exemplary circuit diagram for a differential mode circuit for reducing inter symbol interference, according to an embodiment of the present subject matter.
Figure 7:
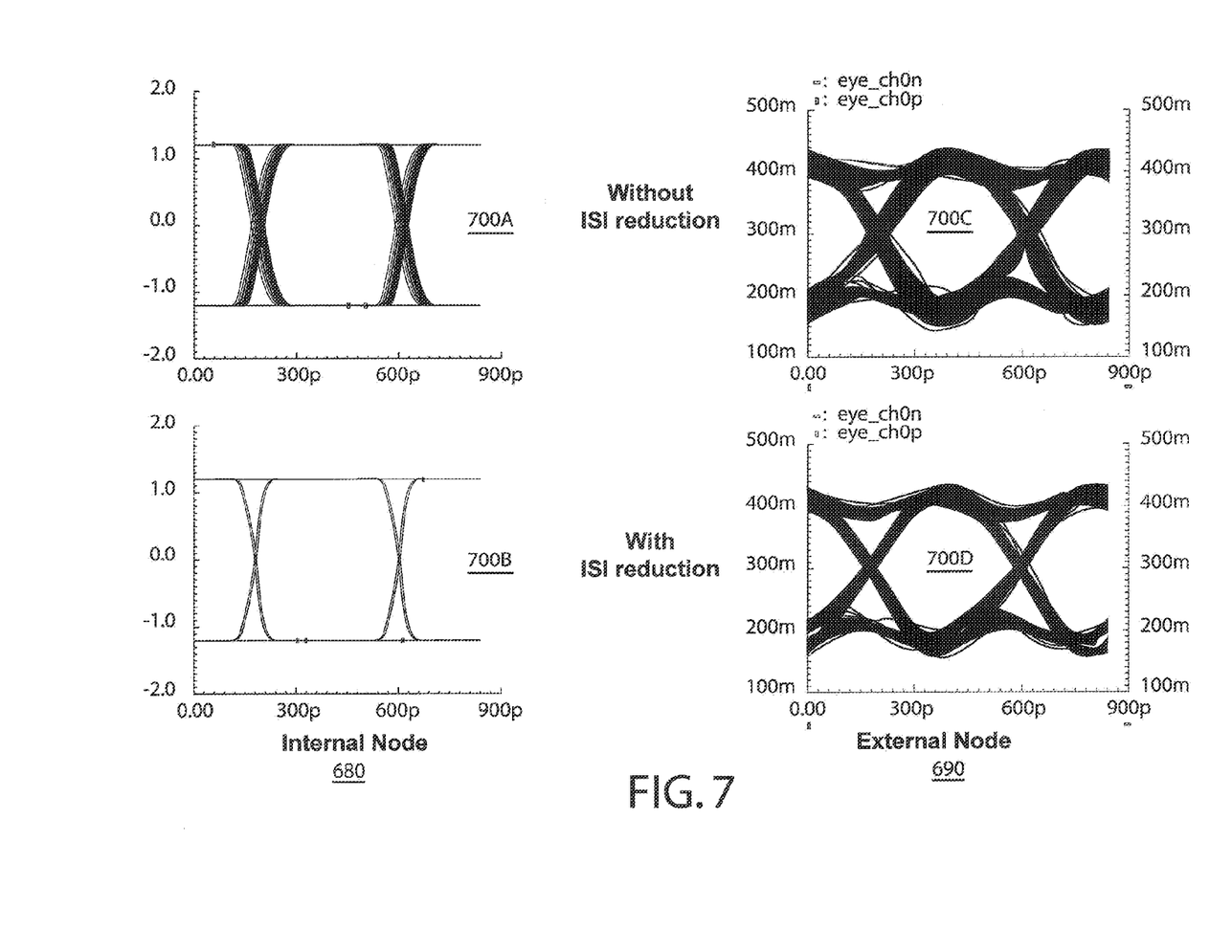
FIG. 7 is a presentation of four simulation results in eye diagram format for the differential mode circuit in FIG. 6.

FIG. 6 is an exemplary circuit diagram for a differential mode circuit 600 for reducing inter symbol interference, jitter, and/or bit error rate in a serialized binary data stream according to an embodiment of the present subject matter. One of skill in the art will readily understand that each of the upper and lower branches of the differential mode circuit 600 are organized and operate in a manner similar to that described above with respect to FIG. 5, and that organization and operation will not be repeated here. The output of the upper branch, COP, and the output of the lower branch, CON, can be combined, at internal node 680, to form an eye diagram as is known in the art. Additionally, the upper output COP can be passed, in a certain embodiment, through buffer 660A and additional circuitry noted as PACKAGE 670A. In a likewise manner, the lower output CON can be passed, in a certain embodiment, through buffer 660B and additional circuitry noted as PACKAGE 670B. The PACKAGE 670A and PACKAGE 670B circuitry are used in simulations to insert a degradation into the COP and CON signal outputs, respectively, as can be seen in FIG. 7, discussed below. The output of the PACKAGE 670A, and the output of the PACKAGE 670B, can be combined, at external node 690, to form an eye diagram as is known in the art.

FIG. 7 is a presentation of four simulation results in eye diagram format for the differential mode circuit in FIG. 6 which shows beneficial results of the ISI reduction circuitry. Graph 700A illustrates the eye diagram of the internal node 680 without the ISI reduction circuitry described above. Graph 700B illustrates the eye diagram of the internal node 680 with the ISI reduction circuitry described above. One of skill in the art will readily see that the eye diagram in graph 700B shows less jitter than in graph 700A. Graph 700C illustrates the eye diagram of the external node 690 without the ISI reduction circuitry described above. Graph 700D illustrates the eye diagram of the external node 690 with the ISI reduction circuitry described above. One of skill in the art will readily see that the eye diagram in graph 700D shows less jitter than in graph 700C.

In an embodiment, a circuit is presented for reducing inter symbol interference. The circuit includes an inverting device having an input lead and an output lead, where the input lead supplies a serial stream of binary data bits which are inverted by the inverting device and output to the output lead. The circuit also includes a decision logic circuit operatively connected to the input lead and to the output lead, where the decision logic circuit produces a first control signal when a low-to-high change in signal level between two consecutive data bits of the serial stream of binary data bits is detected, and where the decision logic circuit produces a second control signal when a high-to-low change in signal level between two consecutive data bits of the serial stream of binary data bits is detected. The circuit further includes a pull circuit operatively connected to a first voltage level, a second voltage level, the input lead, and the decision logic circuit, where the pull circuit connects the input lead to the first voltage level when the pull circuit receives the first control signal, and where the pull circuit connects the input lead to the second voltage level when the pull circuit receives the second control signal.

In another embodiment, a circuit is presented for reducing inter symbol interference where the circuit includes an inverting device having an input lead and an output lead, where the input lead supplies a serial stream of binary data bits which are inverted by the inverting device and output to the output lead. The circuit also includes a pull high decision logic circuit operatively connected to the input lead and to the output lead, where the pull high decision logic circuit produces a first control signal when a low-to-high change in signal level between two consecutive data bits of the serial stream of binary data bits is detected. The circuit further includes a pull low decision logic circuit operatively connected to the input lead and to the output lead, where the pull low decision logic circuit produces a second control signal when a high-to-low change in signal level between two consecutive data bits of the serial stream of binary data bits is detected. The circuit still further includes a pull high circuit operatively connected to the input lead, to a first voltage level, and to the pull high decision logic circuit, where the pull high circuit connects the input lead to the first voltage level when the pull high circuit receives the first control signal. The circuit additionally includes a pull low circuit operatively connected to the input lead, to a second voltage level, and to the pull low decision logic circuit, where the pull low circuit connects the input lead to the second voltage level when the pull low circuit receives the second control signal.

In a further embodiment, a method is presented for reducing inter symbol interference. The method includes the steps of receiving a serial stream of binary data bits on an input lead, inverting the serial stream of binary data bits and outputting a serial stream of inverted binary data bits on an output lead, producing a first control signal responsive to a low-to-high change in signal level between two consecutive data bits in the serial stream of binary data bits, and producing a second control signal responsive to a high-to-low change in signal level between two consecutive data bits in the serial stream of binary data bits. The method further includes the steps of connecting the input lead to a first voltage level when the first control signal is received by a first connecting circuit, and connecting the input lead to a second voltage level when the second control signal is received by a second connecting circuit.

While some embodiments of the present subject matter have been described, it is to be understood that the embodiments described are illustrative only and that the scope of the invention is to be defined solely by the appended claims when accorded a full range of equivalence, many variations and modifications naturally occurring to those of skill in the art from a perusal hereof.

I claim:

1. A circuit for reducing inter symbol interference, comprising:
   an inverting device having an input lead and an output lead, wherein said input lead supplies a serial stream of binary data bits which are inverted by said inverting device and output to said output lead;
   a decision logic circuit including at least one logic gate having a first input connected to said input lead and a second input connected to said output lead, wherein said decision logic circuit produces a first control signal when a low-to-high change in signal level between two consecutive data bits of the serial stream of binary data bits is detected, and wherein said decision logic circuit produces a second control signal when a high-to-low change in signal level between two consecutive data bits of the serial stream of binary data bits is detected; and
   a pull circuit operatively connected to a first voltage level, a second voltage level, said input lead, and an output of said decision logic circuit, wherein said pull circuit connects said input lead to said first voltage level when said pull circuit receives said first control signal, and wherein said pull circuit connects said input lead to said second voltage level when said pull circuit receives said second control signal.

2. The circuit of claim 1 wherein said first voltage level is a voltage source.

3. The circuit of claim 1 wherein said second voltage level is ground.

4. The circuit of claim 1 wherein said first voltage level corresponds to a logical 1 value.

5. The circuit of claim 1 wherein said second voltage level corresponds to a logical 0 value.

6. The circuit of claim 1 wherein said input lead is operatively connected to a high speed data serializer.

7. The circuit of claim 1 wherein said at least one logic gate of the decision logic circuit comprises a NAND gate and the decision logic circuit includes a first delay circuit.

8. The circuit of claim 7 wherein said at least one logic gate of the decision logic circuit further comprises a NOR gate and the decision logic circuit includes a second delay circuit.

9. A circuit for reducing inter symbol interference, comprising:
   an inverting device having an input lead and an output lead, wherein said input lead supplies a serial stream of binary data bits which are inverted by said inverting device and output to said output lead;
   a pull high decision logic circuit including a first logic gate having a first input connected to said input lead and a second input connected to said output lead, wherein said pull high decision logic circuit produces a first control signal when a low-to-high change in signal level between two consecutive data bits of the serial stream of binary data bits is detected;
   a pull low decision logic circuit including a second logic gate having a first input connected to said input lead and a second input connected to said output lead, wherein said pull low decision logic circuit produces a second control signal when a high-to-low change in signal level between two consecutive data bits of the serial stream of binary data bits is detected;
   a pull high circuit operatively connected to said input lead, to a first voltage level, and to an output of the first logic gate of said pull high decision logic circuit, wherein said pull high circuit connects said input lead to said first voltage level when said pull high circuit receives said first control signal; and
   a pull low circuit operatively connected to said input lead, to a second voltage level, and to an output of the second logic gate of said pull low decision logic circuit, wherein said pull low circuit connects said input lead to said second voltage level when said pull low circuit receives said second control signal.

10. The circuit of claim 9 wherein said first voltage level is a voltage source.

11. The circuit of claim 9 wherein said second voltage level is ground.

12. The circuit of claim 9 wherein said first voltage level corresponds to a logical 1 value.

13. The circuit of claim 9 wherein said second voltage level corresponds to a logical 0 value.

14. The circuit of claim 9 wherein said input lead is operatively connected to a high speed data serializer.

15. The circuit of claim 9 wherein said pull high decision logic circuit comprises a NAND gate and a first delay circuit.

16. The circuit of claim 9 wherein said pull low decision logic circuit comprises a NOR gate and a second delay circuit.

17. A method for reducing inter symbol interference, comprising:
   receiving a serial stream of binary data bits on an input lead;
   inverting the serial stream of binary data bits and outputting a serial stream of inverted binary data bits on an output lead;
   producing a first control signal at an at least one decision circuit including at least one logic gate having a first input connected to the input lead and a second input connected to the output lead responsive to a low-to-high change in signal level between two consecutive data bits in the serial stream of binary data bits;
   producing a second control signal at the at least one decision responsive to a high-to-low change in signal level between two consecutive data bits in the serial stream of binary data bits;
   connecting the input lead to a first voltage level when the first control signal is received from the at least one decision circuit by a first connecting circuit; and
   connecting the input lead to a second voltage level when the second control signal is received from the at least one decision circuit by a second connecting circuit.

18. The circuit of claim 17 wherein said first voltage level corresponds to a logical 1 value.

19. The circuit of claim 17 wherein said second voltage level corresponds to a logical 0 value.

20. The circuit of claim 17 wherein said input lead is operatively connected to a high speed data serializer.

* * * * *